United States Patent [19]
Hoult et al.

[11] 3,802,201
[45] Apr. 9, 1974

[54] ROUGH WATER BARRIER

[76] Inventors: David P. Hoult, 30 Norwich Rd., Wellesley, Mass. 02181; Jerome H. Milgram, 2 Kelley Rd., Cambridge, Mass. 02134

[22] Filed: Jan. 4, 1972

[21] Appl. No.: 215,307

Related U.S. Application Data

[63] Continuation-in-part of Ser. No. 79,051, Oct. 8, 1970, which is a continuation-in-part of Ser. No. 54,530, July 13, 1970.

[52] U.S. Cl. .................................................. 61/1 F
[51] Int. Cl. ............................................ E02b 15/04
[58] Field of Search..... 61/1 F, 5; 210/242, DIG. 21

[56] References Cited
UNITED STATES PATENTS
3,184,923   5/1965   Galvaing .............................. 61/1 F
3,564,852   2/1971   Smith .................................. 61/1 F FOREIGN PATENTS OR APPLICATIONS
980,732   1/1965   Great Britain ........................ 61/1 F
2,009,655   2/1970   France ................................ 61/1 F

OTHER PUBLICATIONS
Ocean Industry, February 1970; page 84.

*Primary Examiner*—Peter M. Caun

[57]    ABSTRACT

A barrier for use in rough water to contain a material such as oil floating upon the water including a deformable barrier sheet vertically disposed in the water and attached to a supporting and stabilizing structure which comprises a number of vertical supporting elements to which the sheet is attached; stabilizing means, including flotation means and tension controlling means, for maintaining each supporting element in a hydrodynamically stable configuration; and slack control means to maintain slack in the sheet between each pair of adjacent supporting elements.

7 Claims, 12 Drawing Figures

ROUGH WATER BARRIER

This application is a continuation-in-part of Ser. No. 79,051, filed Oct. 8, 1970, which was in turn a continuation-in-part of Ser. No. 54,530, filed July 13, 1970.

Its invention relates to improvements in floating barriers designed to contain a material floating on the surface of water. It is particularly designed to contain oil floating on the surface of the sea at a location in which relatively rough seas can be anticipated and, in some forms, to be collapsible to simplify its transportation to a remote location.

Although there are many existing barriers or booms designed to contain a material floating upon water, all of these are either specifically designed for use in relatively calm water (e.g., in a protected harbor) or have been found wanting when employed in relatively rough seas, particularly as to their stability and portability.

When a barrier, comprising a vertical sheet of fabric of length L and draft D is placed in current, the drag force of the current causes the barrier to assume a roughly parabolic shape, and the barrier carries a certain tension. The tension is transferred to the moorings of the barrier in such a manner as to balance the net drag force acting on a barrier. This tension can be substantial: for a barrier 1000 feet long and 3 feet deep in a 2 knot current with the ends of the barrier on a line perpendicular to the current and about 400 feet apart, the tension is about 10,000 lbs.

If the tension is carried in the vertical sheet of the barrier, then, as the barrier rolls in a wave field, first the lower edge, and then the upper edge, of the barrier becomes slack. Thus, the location of the tension carrying force shifts from the lower to the upper edge of the barrier. This constantly shifting tension force destabilizes the barrier, causing it to roll over in the waves.

In view of the foregoing, it is a principal object of the invention to provide a barrier of the type described which is hydrodynamically stable in strong currents and high waves. (A typical barrier of the design described below, having a 2 ½ foot draft, is stable in waves 5 or 6 feet high, and currents in excess of 2 knots.)

It is another object of the invention to provide a collapsible barrier of the type described.

The invention herein provides for the articulation of a barrier operating in rough water, this articulation allowing the barrier to follow the waves while remaining vertical. This design provides a vertically stiff barrier having essentially zero stiffness in all other directions and allows each element of the barrier to move independently of the neighboring elements of the barrier in surge (horizontal motion), heave (vertical motion) and roll or twist about a horizontal axis. It may also provide a collapsible barrier having such characteristics.

According to the invention, there is provided such a floating barrier for use where maximum wave amplitudes and minimum wave lengths of predetermined values are anticipated. (Typical wave amplitudes would be 5 feet, and wave lengths of 60 feet.) The barrier includes flotation means which may be collapsible and inflatable comprising a plurality of spaced apart flotation elements and sheet-like barrier means disposed between adjacent flotation element pairs in a generally vertical orientation. The horizontally extended vertically stiff barrier sheet has vertically disposed supporting or reinforcing elements spaced closer than one-fifth the minimum anticipated wave length and each flotation element is attached to supporting means which may comprise a pair of vertically extending rigid support members connected to said sheet and to said flotation element on opposite sides thereof. Flexible tie elements may also be provided between the bottom of the support members and the ends of the flotation elements. Restraining or "slack control" means are provided to prevent the separation of at least one portion of each reinforcing element (at the axis of hydrodynamic stability of the barrier) and a similar portion of each adjacent reinforcing element from exceeding a predetermined value; that value being less than the perpendicular distance along the barrier sheet between each pair of adjacent reinforcing elements thereby maintaining slack in the barrier sheet. This difference in distance is typically 20 percent of the spacing between reinforcing elements. The purpose of this slack control is to prevent the sheet-like flexible fabric from becoming taut.

Tension controlling means (to relieve tension from the sheet-like barrier) comprises an elastic flexible member attached to each vertically disposed reinforcing element of the barrier by a novel flexible bridle connector assembly, preferably including a central connector element which may be connected between the lower ends of said support members and the tension controlling member and side connector elements which may be connected between the support members adjacent a flotation element and the tension controlling member on opposite sides of the central connector element to provide a uniquely stable arrangement. The flexible tension controlling member has a length about equal to 90 percent of the length of the barrier as determined by the restraining means which limit the separation between adjacent reinforcing elements.

Other objects, features, and advantages of the invention appear from the following description of preferred embodiments thereof, taken together with the attached drawings in which.

Figure 1:
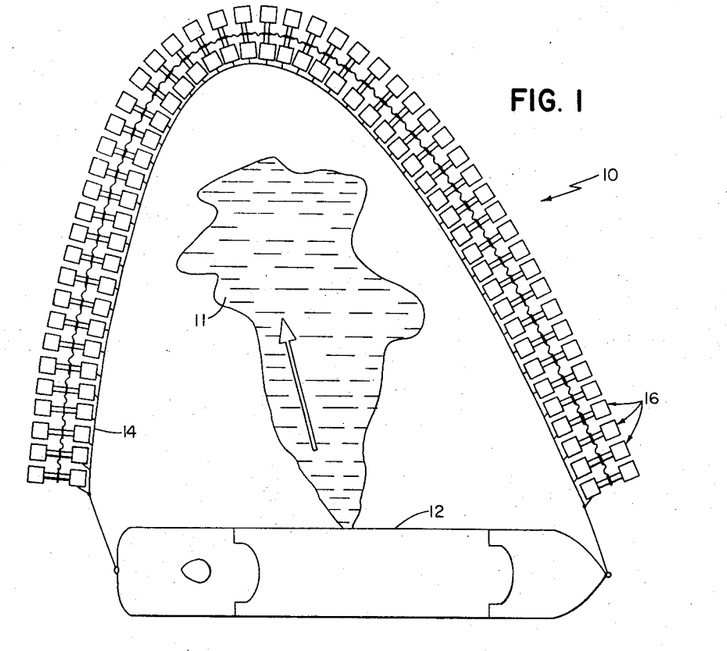
FIG. 1 is a diagrammatic plan view of a first embodiment of a barrier constructed according to the invention used in connection with a disabled ship.

As shown in FIG. 1, the barrier, generally designated 10, may be employed to contain oil 11 leaking from a disabled vessel 12 upon the open seas. (The size of the elements of barrier 10, relative to vessel 12, has been increased to aid the description.) The arrow of FIG. 1 indicates the direction of current at the vessel's location. As diagrammatically illustrated in FIG. 1, the barrier assumes a generally parabolic configuration under the influence of the force of the current. The flexibility of the barrier 10 which permits this configuration is described in detail below. The barrier is provided with a tension controlling cable 14 which also assumes a parabolic configuration and whose construction and operation is also described in detail below.

Figure 2:
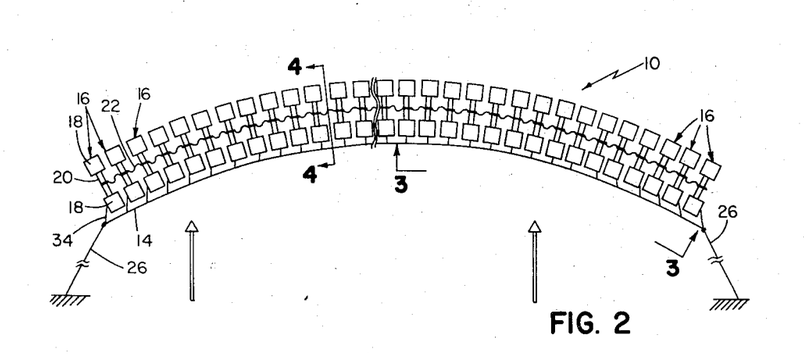
FIG. 2 is another diagrammatic plan view of the barrier of FIG. 1.

FIG. 2 illustrates a portion of the barrier 10 with a less accentuated curvature so that the general construction may be more easily seen.

The vertically stiff, horizontally extended, flexible barrier 10 includes a large number of flotation elements 16 (or 16' of FIGS. 6 through 12) mounted thereon so as to maintain said barrier generally perpendicular to the wave surface. In one preferred construction, shown in FIGS. 1 through 5, each flotation element includes two large diameter cylindrical portions 18 and a smaller diameter cylindrical portion 20. These portions are interconnected in a "dumbbell" arrangement with the axis generally parallel to the local surface of the water. The purpose of these dumbbell-shaped flotation elements is twofold. First, they are rigidly mounted perpendicular to the barrier and have a transverse length about twice the barrier draft and extend on each side of the barrier for a distance about equal to the barrier draft, thus locally stabilizing the barrier in roll. Second, they are very light and buoyant, so that the local natural frequency of the barrier in vertical motion is much higher than the dominant frequency of the wave field in which it rides, so that the barrier may be made to closely follow the irregular sea surface, much as does a beachball.

Due to the relatively large length of the dumbbell-shaped elements and their relatively rigid mounting, the vertical sheet 22 (or 22' of FIGS. 6 through 12) of the barrier is caused at all times to be perpendicular to the water surface. It has been found that the dumbbell shape has a lower apparent mass in heave than a straight cylinder of the same maximum diameter and length. This lower apparent mass causes the dumbbell shape to have a higher natural frequency in heave than the straight cylinder, better to follow the waves.

In another preferred construction, shown in FIGS. 6 through 12, each flotation element 16' is cylindrical and is constructed of collapsible, flexible, gas-tight sheet material for inflation as by compressed air bottles mounted thereon. The purpose of the collapsible cylindrical flotation elements is threefold, in that a third purpose is added to those recited above, namely, that they may be collapsed upon deflation to provide a relatively flat foldable barrier assembly, as is important for transportation of the barrier to remote locations, especially by aircraft from which the barrier may be air dropped at sea for rapid deployment.

The sheet-like barrier curtain 22 or 22' extends between each adjacent pair of flotation elements 16 and 16'. Each flotation element 16 or 16' is attached to the barrier curtain in a fashion described in detail below. In its presently preferred form, the barrier curtain is a vinyl-coated nylon which is approximately 0.015 inch thick. Due to the relatively large length of the flotation elements and their rigid mounting, as hereinafter described in detail, the vertical sheet 22 or 22' of the barrier is caused at all times to be perpendicular to the water surface.

Still referring to FIG. 2, mooring means are provided in the form of a pair of lines 40 which are secured to the ends of the tension relieving cable 14.

Tension controlling means are provided in the form of the elastic, flexible cable 14, preferably of nylon rope, which is secured to the barrier 10 by novel bridle connector elements attached at each vertical pair of support members (described below) of the barrier 22 or 22'. The specific form of attachment has been found to be of some importance and is discussed in detail below, both as to two and three element bridles. The cable 14 effectively relieves tension and hence uncouples the motion of the barrier in heave from its motion in roll. This action is also described further below.

Figure 3:
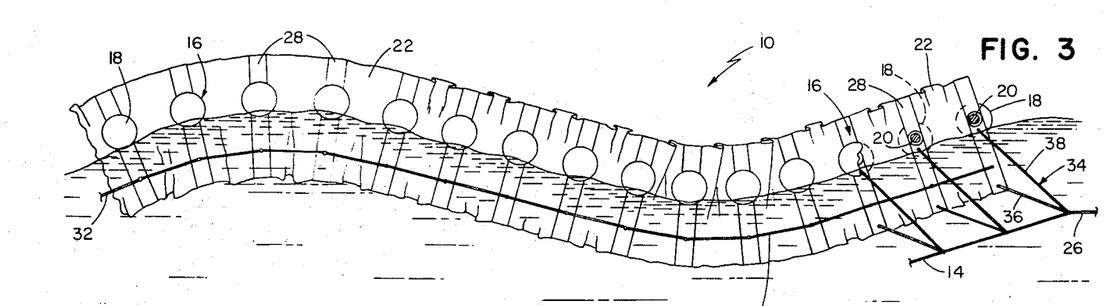
FIG. 3 is a view taken at line 3—3 of FIG. 2.
Figure 4:
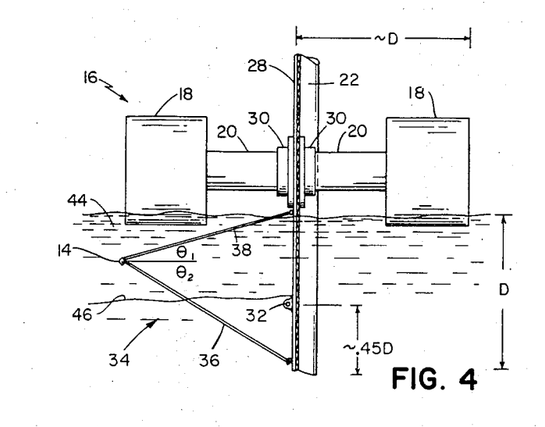
FIG. 4 is a view taken at line 4—4 of FIG. 3.
Figure 5:
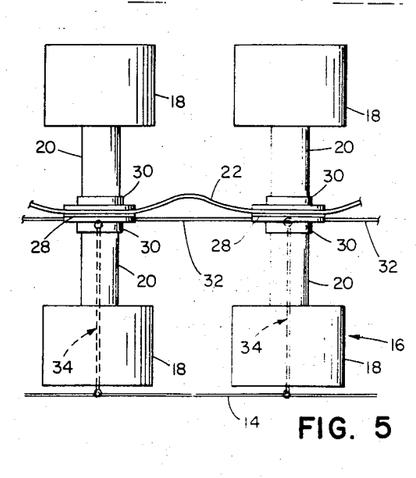
FIG. 5 is a somewhat diagrammatic plan view of a portion of the barrier of FIG. 2.

Referring now to FIGS. 3, 4 and 5, the preferred details of construction of a first embodiment of a barrier according to the invention will be more particularly described.

The barrier curtain 22 is provided with a series of rigid reinforcing or supporting elements 28, which may take the form of ¼ inch thick reinforced fiberglass strips extending perpendicularly from the top to the bottom of the barrier curtain 22 and attached thereto. A suitable means of attachment is simply to fasten mechanically the fiberglass strip 28 to the curtain 22 by means of aluminum rivets.

Each flotation element 16 is attached, effectively rigidly, at right angles to one of the vertical fiberglass strips 28. This may be easily accomplished in the preferred embodiment where the cylindrical portions 18 and 20 of each flotation element 16 are air inflated and are attached to the fiberglass strips 28 (see FIGS. 4 and 5). In this case, the vertical fiberglass strips 28 are merely provided with an aperture of the same diameter as the flotation element, so that air may pass therethrough. The portion 20 of flotation element 16 may then comprise two parts (one on either side of fiberglass reinforcing strip 28). With each of the air inflated elements fitted with a flange 30, the flotation element 16 is effectively secured to the reinforcing member 28.

A slack controlling cable 32 is strung between the reinforcing elements 28 and is attached to each such reinforcing element in the lower portion thereof. As best shown in FIG. 5, the length of the cable 32 between adjacent reinforcing elements 28 is fixed at such a length that the barrier curtain 22 is slack between adjacent reinforcing elements 28. Cable 32 is located about 0.45 D (D, as defined above, being the draft of the barrier) above the lower edge of the barrier, the location of the steady state hydrodynamic center of the present barrier design.

In general, the restraining means for maintaining slack between vertical stiffeners should be attached at the place where the steady state drag force acts (i.e., the locus of hydrodynamic stability), so that the drag due to the steady current does not destabilize the barrier in roll.

The purpose of the vertical reinforcing elements 28 is to provide a vertically stiff barrier curtain 22 which will not buckle in the vertical plane. Such a design, however, allows the tension force to shift, and thereby destabilize the barrier. To avoid this, slack controlling cable 32 has been provided to carry the tension so that the slack is maintained at all times in the curtain 22 itself. As will be seen from the discussion below, this construction prevents the location of the tension force from shifting and allows each reinforcing element 28 to roll independently of the neighboring elements.

It has also been found that the largest moments acting on the barrier 10 are due to waves, and that these moments are of such a size that each section of the barrier needs to be stabilized by the provision of flotation elements 16 of construction similar to that described above. It has been determined that the basic requirements of such flotation elements are large size and a high degree of buoyancy. These two factors combine to give the flotation element a very high natural frequency in heave, thereby enabling it to respond to complex wave motion.

To further reduce the tension acting on the barrier, and to uncouple the motion of the barrier in heave from that in roll, tension relieving cable 14 is attached to the barrier by bridles 34 associated with each of the vertical fiberglass reinforcing elements 28. With a tension relieving cable 14 of about the same length as the total length of cable 32, it has been found that in a current, the tension relieving cable remains nearly stationary while the barrier itself moves easily in the wave field.

The bridles 34 mentioned above are best seen in FIG. 4, and each comprises a pair of lines 36 and 38. Lines 36 are attached to the reinforcing elements 28 near their lower edge 40 and lines 38 are preferably attached to the reinforcing elements 28 slightly above the element's midpoint but below the location at which the flotation element is attached to the reinforcing element 28. The line 38 is preferably somewhat shorter than the line 36. Their free ends may be joined at cable 14 to form angles (when the lines are taut) with the horizontal of $\phi_1 = 15° \pm 5°$ and $\phi_2 = 32° \pm 5°$ (see FIG. 4). The mooring line 26 may then be attached to the cable 14 by any suitable means.

While it is not entirely necessary that there be a bridle 34 connecting each reinforcing element 28 to the tension controlling cable 14, the bridles should not be spaced far apart relative to the wave length of the local ocean waves. Thus, it has been determined that performance of the barrier may be degraded if there are not at least five bridles per wave length.

The action of the tension relieving cable 14 may be illustrated by assuming its non-existence, in which case the tension produced by the current is borne by the line 32. This tension causing the line 32 to remain spatially fixed, the barrier curtain 22 will flop over on its side as a wave trough goes by, there being nothing to support the barrier in the roll because the flotation elements 16 have lifted out of the water. Thus it may be seen that the purpose of the bridle arrangement is to allow the barrier to heave and surge independently of how it rolls. For optimal functioning of the bridle, the dimensions and locations of attachment mentioned above should be observed. When this is done, a barrier of a 2 ½ foot draft will neither dive under nor lift out of the water until currents greater than four knots are experienced. It has further been found that in a short wave length, regular sea, the bridle augments somewhat the roll stability of the barrier.

A further advantage of the present design is that when the design current of four knots is exceeded, the barrier pulls out of the water, and rides on its lower edge, so as to reduce the forces acting on it. This action, attained by properly adjusting the lengths of the lines 38 and 36 (FIGS. 1–5) or lines 134, 136 and 138 (FIGS. 6–9) or lines 154, 156 (FIGS. 10–12), prevents destruction of the barrier due to excessive forces.

When such a bridle is employed in a wave field, first one line and then the other of the bridle goes slack (depending upon the motions of the barrier). This indicates the necessity of flotation elements 16 or 16' since the bridle does little to roll stabilize the barrier.

Still referring to FIG. 4, the action of the barrier sheet 22 in containing oil 44 floating upon the surface 46 of the water may be seen. Assuming a current from left-to-right in FIG. 4, the oil 44 is kept to the left of the barrier 10 by the sheet or curtain 22. The draft D of the sheet 22 must be sufficient to extend below the floating oil and into the water itself. Furthermore, the draft D must exceed some minimum value for the stabilized barrier operation described herein. Although this minimum value is empirically determined for each individual barrier design according to the invention, it is known that with a construction such as illustrated and described in detail herein, D may be at least as small as 2 ½ feet in waves having amplitudes of about 5 feet.

We also have found that added elasticity in the tension carrying cable 14 keeps the bridles taut more of the time. By constructing the tension carrying cable of relatively elastic material such as nylon, the jerky motion of the barrier causing oil to splash over it or under it is prevented. Increasing the elasticity of the tension carrying cable also improves the roll stability of the barrier.

Referring now to FIGS. 6, 7, 8 and 9, the preferred details of construction of a collapsible barrier according to the invention will be more particularly described.

The barrier curtain 22' is provided with a series of pairs of vertically extending rigid support members 124, 126 which may take the form of one inch pipes extending from the top to the bottom of the barrier curtain 22' attached together at their bottom ends by a suitable fitting 125 and passing on each side of a flotation element 16' so that they are in an upright "V" configuration in the plane of barrier 10. A suitable means of attachment to barrier sheet 22' is by the use of pockets in said sheet.

Each flotation element 16' passes through and is attached, effectively rigidly, at right angles between support members 124 and 126. This may be easily accomplished in the preferred embodiment where the cylindrical flotation elements 16' are air inflated by compressed air bottles 118 and are attached to the barrier sheet 22' adjacent said support members as by a flange 120 on flotation element 16' (see FIGS. 6, 8 and 9). The free ends of flotation element 16' are supported by flexible tie elements 128, 130 connected to support member bottom fitting 125, providing support when said elements are inflated, yet collapsing with said flotation elements when they are deflated.

Figure 10:
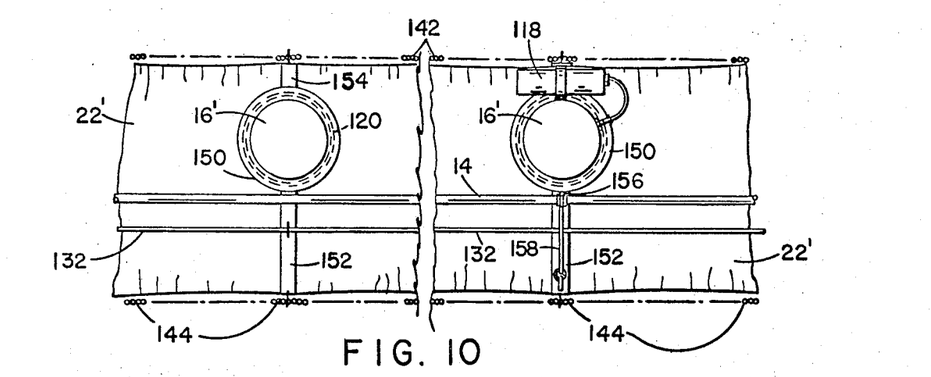
FIGS. 10, 11 and 12 are, respectively, end, side and top views of a barrier modified from that of FIGS. 6 through 9.
Figure 11:
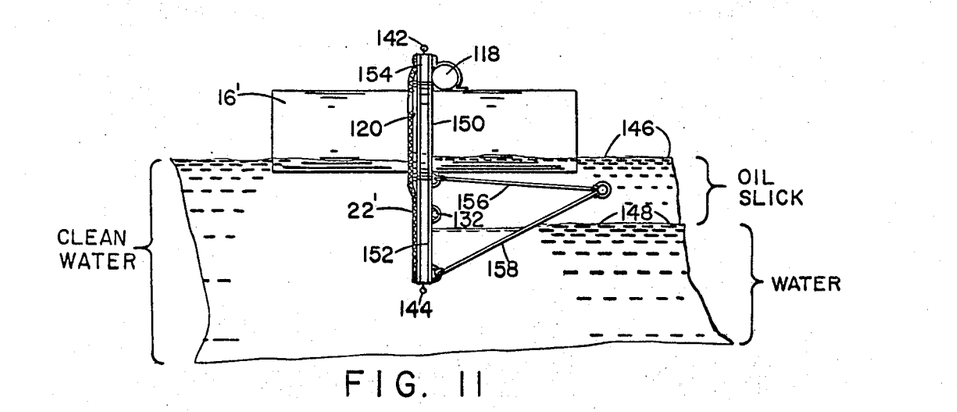
Figure 12:
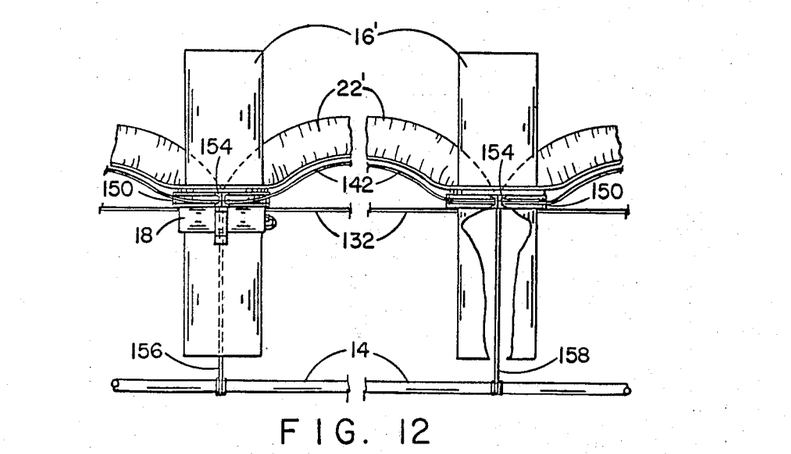

In FIGS. 10, 11 and 12 is shown a modified construction wherein barrier curtain 22' is provided with support members which surround a flotation element 16' in the form of a rigid ring 150 having a lower rigid extension arm 152 and an upper rigid extension arm 154, extending from the top to the bottom of barrier curtain 122 and attached thereto. Ring 150 is attached to flotation element flange 120, providing a sufficiently rigid connection so that tie elements are not necessary.

Figure 9:
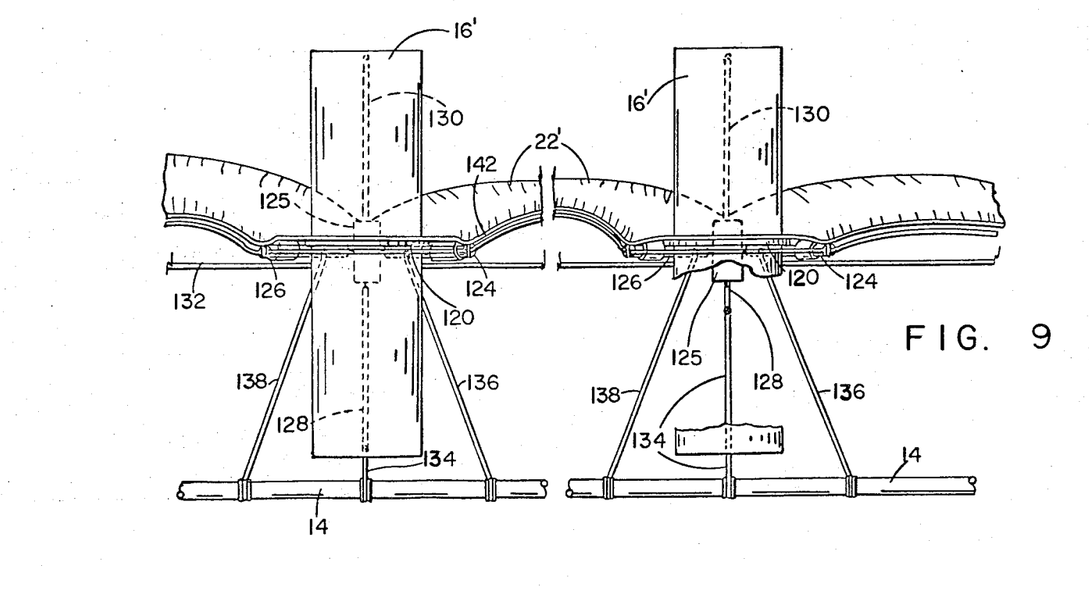
FIG. 9 is a somewhat diagrammatic plan view of the barrier of FIG. 6.

A slack controlling cable 132 is strung between the series of pairs of support members 124, 126 (FIGS. 6 through 9) or on the lower extensions 152 of the ring supporting members (FIGS. 10 through 12). Cable 132 is attached to each such member in the lower portion thereof. As best shown in FIGS. 9 and 12, the length of the cable 132 between adjacent pairs of support members 124, 126 or extensions 152 is fixed at such a length that the barrier curtain 22' is slack therebetween. Cable 132 is located about 0.45 D (D, as defined above, being the draft of the barrier) above the lower edge of the barrier, the location of the steady state hydrodynamic center of the barrier design.

The three bridle connectors mentioned above are best seen in FIGS. 6, 8 and 9 and each comprises three lines 134, 136 and 138. Central, transversely extending line 134 is attached to the lower end fitting 125 of a pair of support members 124, 126 adjacent flotation element 16' slightly above their midpoints at the lower side of flotation element 16'.

The other end of central line 134 extends directly transversely to a connection on tension relieving cable 14, while the side lines 136, 138 extend somewhat outwardly away from one another and are connected to said cable on opposite sides of the connection of central line 134. The free ends of the central and side lines may be joined at cable 14 to form angles (when the lines are taut) with the horizontal of $\phi_1 = 15° \pm 5°$ and $\phi_2 = 32° \pm 5°$ (see FIG. 8). This bridle arrangement provides a uniquely stable assembly, by reason of the spacing of the side connectors from one another at their attachment points as well as their spacing on each side of the central connector.

A conventional two bridle assembly may also be used, as shown in FIGS. 10, 11 and 12, including a lower bridle 154 connected between the lower end of lower extension arm 152 and cable 14 and an upper bridle connected between the upper end of said extension adjacent flotation element 16' and cable 14.

The mooring lines 140 may be attached to the cable 14 by any suitable means.

Figures 6, 8:
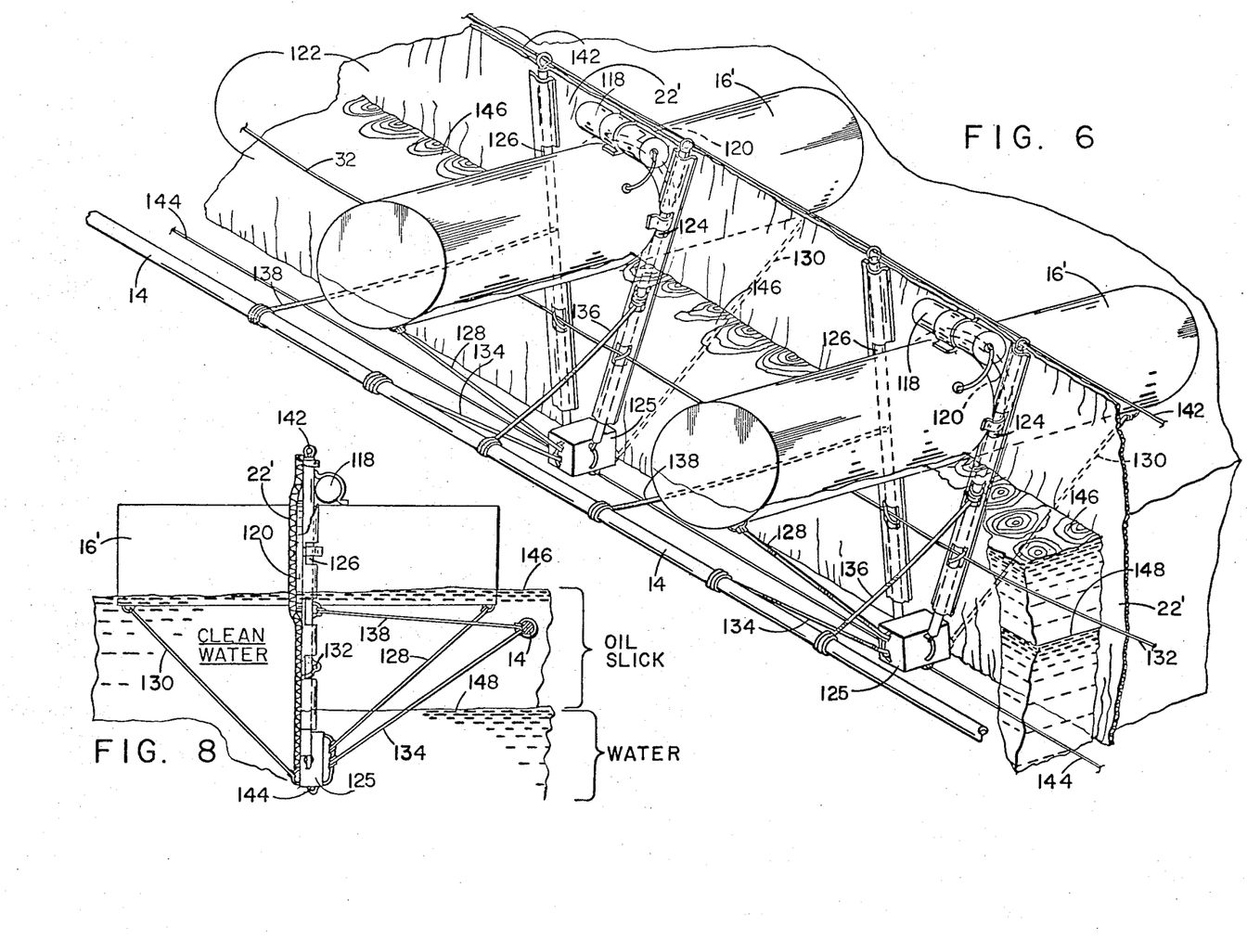
FIG. 6 is an enlarged, somewhat diagrammatic isometric view of a second embodiment of a barrier constructed according to the invention, showing the flotation element, support members, tie elements and bridle connectors thereof.
FIG. 8 is an end sectional view of the barrier of FIG. 6.
Figure 7:
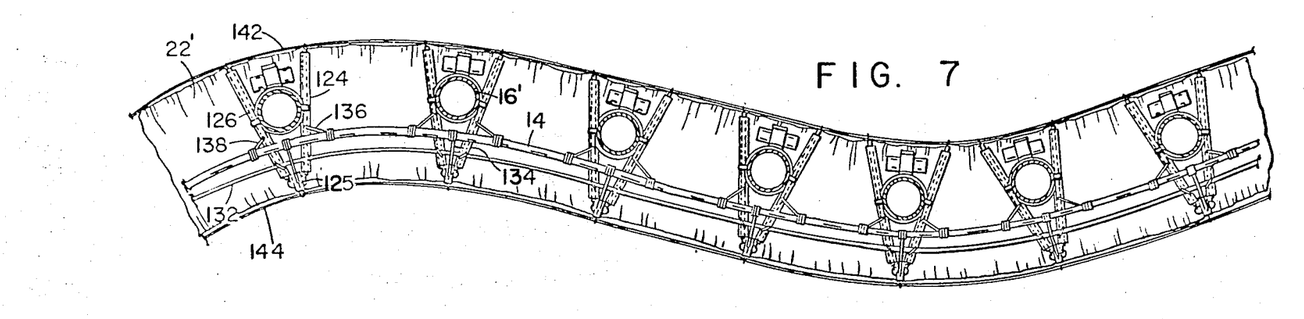
FIG. 7 is a side view of the barrier of FIG. 6.

The flexible tie elements 128, 130 referred to in connection with FIGS. 6, 8 and 9 are especially useful in providing support for the flotation elements 16' so that such elements need not be supported in cantilever from their central vertically extending rigid supports, regardless of the specific construction of the latter. To this end, such tie members are also useful in connection with flotation elements of generally dumbbell configuration, earlier disclosed in connection with FIGS. 1 through 5, in which separate flotation elements, spaced on opposite sides of the barrier curtain, are connected together and to the barrier curtain by a relatively small diameter tube or rod, which reduces the gas supply requirements with inflatable elements.

If desired, top and bottom grab lines 142, 144 respectively, may be connected between the tops and bottoms of the pairs of support members 124, 126, or extensions 154, 152, leaving sufficient slack therein so that they do not interfere with the operation of the barrier as described above. Lower grab line 144 may be of chain for weighting. Similar grab lines may be used with the embodiment of FIGS. 1 through 5. As shown in FIG. 8, the oil 146 floating on water surface 148, with a left to right current, is kept to the left of the barrier 10 by the sheet or curtain 22'. The draft D of the sheet 22' must be sufficient to extend below the floating oil and into the water itself.

It is a particular feature of the collapsible barrier of the invention that it may be deflated and collapsed into a relatively flat foldable assembly, which may be packaged into a reasonable volume. As deflated, a barrier of the type described will have a maximum thickness of about 3 inches at the flotation and supporting portions, and a 1000 foot length thereof containing about 200 flotation and supporting modules can be flake folded into a package about 25 feet long and 5 feet high, which package will readily fit into a C-130 aircraft for air deployment.

It will be understood by those skilled in the art that the barrier sheet or curtain of the preferred embodiments may be replaced by any other means having the desired properties. Specifically, whatever extends between adjacent reinforcing elements should be substantially impervious to the material to be contained, and should be relatively flexible and/or deformable to permit the independent movement of the reinforcing elements in heave, surge and roll.

While several embodiments of a floating barrier according to the invention have been described in detail, it will be apparent to those skilled in the art that many other embodiments are within the scope of the invention and of the appended claims.

What is claimed is:

1. In a floating barrier including a deformable barrier sheet vertically disposed in the water
    that improvement wherein said sheet is attached to a plurality of supporting and stabilizing structures, comprising
    flotation means comprising a flotation element extending transversely of said barrier on each side thereof and having free ends therebeyond and
    supporting means comprising a pair of vertically extending rigid support members connected to said sheet and to said flotation element on opposite sides thereof and connected together below said float.

2. In a floating barrier as claimed in claim 1 wherein said support members are connected together at their lower ends in an upright "V" configuration.

3. In a floating barrier as claimed in claim 1 further including
    tie means extending between the connected lower ends of said support members and the free ends of said flotation element.

4. In a floating barrier including a deformable barrier sheet vertically disposed in the water and a tension controlling flexible element extending along said sheet generally parallel thereto and spaced therefrom,
    that improvement wherein said sheet is attached to a plurality of supporting and stabilizing structures and to said flexible element, comprising
    flotation means comprising a flotation element extending transversely of said barrier
    supporting means comprising a pair of vertically extending rigid support members connected to said sheet and to said float on opposite sides thereof and connected together below said flotation element and
    flexible bridle connector elements connected between said support members and said tension controlling element including a transversely extending central connector element extending between the lower connected ends of said support members and a side connector element extending between each of said support elements adjacent said flotation element and said tension controlling element on opposite sides of said central connector element.

5. In a floating barrier as claimed in claim 4 wherein said float extends transversely of said barrier on each side thereof and has free ends extending therebeyond
and further including
a flexible tie element extending between the connected lower ends of said support members and the free ends of said float.

6. In a collapsible floating barrier including a deformable barrier sheet vertically disposed in the water and a tension controlling flexible element extending along said sheet generally parallel thereto and spaced therefrom
that improvement wherein said sheet is attached to a plurality of supporting and stabilizing structures and to said flexible element, comprising
an inflatable flotation element of flexible sheet material extending transversely of said barrier on each side thereof and having free ends therebeyond
supporting means comprising a pair of vertically extending rigid support members connected to said sheet and to said flotation element on opposite sides thereof, said members being connected together at their lower ends in upright "V" configuration
flexible tie elements extending between the connected lower ends of said support members and the free ends of said flotation element
flexible bridle connector elements connected between said support members and said tension controlling element including a transversely extending central connector element extending between the lower connected ends of said support members and a side connector element extending between each of said support elements adjacent said flotation element and said tension controlling element on opposite sides of said central connector element,
said barrier being collapsible upon deflation of said flotation elements providing a relatively flat foldable assembly.

7. In a floating barrier as claimed in claim 6 wherein said barrier sheet has a longitudinal axis of hydrodynamic stability, and wherein
said central connector element is connected to said support members below said axis and
said side connector elements are connected to said support members above said axis
providing a barrier stabilized in the presence of wave action in ocean waves.

* * * * *